United States Patent [19]

Farineau et al.

[11] Patent Number: 5,365,446
[45] Date of Patent: Nov. 15, 1994

[54] SYSTEM FOR INTEGRATED PITCH AND THRUST CONTROL OF ANY AIRCRAFT

[75] Inventors: Jacques Farineau; Panxika Larramendy, both of Toulouse, France

[73] Assignee: Aerospatiale Societe Nationale Industrielle, Paris, France

[21] Appl. No.: 820,633
[22] PCT Filed: Jul. 3, 1991
[86] PCT No.: PCT/FR91/00533
§ 371 Date: Jan. 24, 1992
§ 102(e) Date: Jan. 24, 1992

[30] Foreign Application Priority Data

Jul. 4, 1990 [FR] France .................. 90 08479

[51] Int. Cl.$^5$ ............................................ G05D 1/08
[52] U.S. Cl. ................................. 364/433; 244/181; 244/182
[58] Field of Search ................ 364/433, 434; 244/180, 244/181, 182

[56] References Cited

U.S. PATENT DOCUMENTS

| | | | |
|---|---|---|---|
| 3,512,737 | 5/1970 | Platt et al. | 244/77 |
| 4,093,158 | 6/1978 | Clews et al. | 244/181 |
| 4,266,743 | 5/1981 | Kelley | 244/182 |
| 4,277,041 | 7/1981 | Marrs et al. | 244/182 |
| 4,357,663 | 11/1982 | Robbins et al. | 364/433 |
| 4,589,616 | 5/1986 | Zweifel | 244/182 |
| 4,764,872 | 8/1988 | Miller | 364/433 |
| 4,964,599 | 10/1990 | Farineau | 244/195 |
| 5,031,102 | 7/1991 | Robbins et al. | 364/433 |
| 5,079,711 | 1/1992 | Lambregts et al. | 364/433 |

FOREIGN PATENT DOCUMENTS 0296951 12/1988 European Pat. Off. .
2245999 4/1975 France .
1477656 6/1977 United Kingdom .

OTHER PUBLICATIONS

R. A. Hess et al., Journal of Guidance And Control And Dynamics, vol. 9, No. 6, (Nov. 1986), pp. 614 to 619.

Primary Examiner—Gary Chin
Attorney, Agent, or Firm—Fisher, Christen & Sabol

[57] ABSTRACT

A system for integrated pitch and thrust control of an aircraft. The system includes a calculation device which receives the first to sixth electrical signals, together with the tenth electrical signal and delivers first and second linear combinations of the first and second electrical signals, with the coefficients given to the first and second electrical signals, respectively, in the first and second linear combinations depending on the third to sixth and tenth electrical signals; another calculation device which receives the third to tenth electrical signals and generates third and fourth linear combinations of the seventh to tenth electrical signals, the coefficients given to the seventh to tenth electrical signals, respectively, in the third and fourth linear combinations depending on the third to sixth and tenth electrical signals; an adder which receives the first and third linear combinations and adds them to form a pitch electrical command which is applied to the first airfoils; and a second adder which receives the second and fourth linear combinations and adds them to form a thrust electrical command which is applied to an engine of the aircraft.

6 Claims, 3 Drawing Sheets

SYSTEM FOR INTEGRATED PITCH AND THRUST CONTROL OF ANY AIRCRAFT

BACKGROUND OF THE INVENTION

The present invention relates to a system for integrated pitch and thrust control of an aircraft.

At present, aircraft carry both a pitch control system under the control of the joystick made available to the pilot and acting on the pitch control surfaces and/or the optional adjustable horizontal tail plane of the aircraft, and also a thrust control system for controlling the speed of the aircraft, said thrust control system being controlled by an automatic or manual throttle acting on the engine(s) of the aircraft.

Thus, when the pilot seeks to change the longitudinal trim of the aircraft, he moves the joystick of the pitch control system accordingly such that the pitch control surfaces and/or the adjustable horizontal tail plane are tilted in the desired direction. However, such a change in trim also changes the speed of the aircraft: if its nose goes up, its speed goes down, whereas if its nose goes down its speed goes up. As a result, after a pilot has acted on the pitch control system, he must act on the thrust control system to bring the aircraft speed back to the desired value.

Conversely, when the pilot desires to change the speed of the aircraft, he operates the throttle of the engine thrust control system. However, such a change in the speed setting gives rise to a pitching movement such that after acting on the speed control system, the pilot needs to act on the pitch control system to return the aircraft to the desired trim, if the longitudinal motion of the said aircraft is to be controlled.

It can thus be seen that a change in the speed or the trim setting of an aircraft obliges the pilot to act on two control systems: pitch and speed.

BROAD DESCRIPTION OF THE INVENTION

An object of the present invention is to remedy this drawback. It reduces the workload on the pilot while providing greater safety and improving the comfort of passengers in the aircraft.

To this end, the pitch and thrust control system of the invention for an aircraft comprises:

BACKGROUND ART first airfoils for pitch control actuated from a first actuator member associated with a first transducer delivering a first electrical signal representative of a longitudinal parameter setting;

at least one engine controlled from a second actuator member associated with a second transducer delivering a second electrical signal representative of a speed setting for said aircraft;

a plurality of second airfoils capable of taking up different relative positions as a function of each stage of flight of the aircraft, defining particular aerodynamic configurations, with one or other of said aerodynamic configurations being selected by actuating a third actuator member associated with a third transducer delivering a third electrical signal representative of the selected configuration;

means suitable for delivering a fourth electrical signal representative of the mass of said aircraft;

means suitable for delivering a fifth electrical signal representative of the distance along the longitudinal axis of said aircraft between the center of gravity of said aircraft and an origin;

means suitable for delivering sixth, seventh, eighth, ninth, and tenth electrical signals respectively representative of the instantaneous flight altitude, aerodynamic angle of incidence, pitching rate, longitudinal trim, and speed of said aircraft;

a first calculation device receiving said first to sixth electrical signals, together with said tenth electrical signal and delivering first and second linear combinations of said first and second electrical signals, with the coefficients given to said first and second electrical signals respectively in said first and second linear combinations depending on said third to sixth and tenth electrical signals;

a second calculation device receiving said third to tenth electrical signals and generating third and fourth linear combinations of said seventh to tenth electrical signals, the coefficients given to said seventh to tenth electrical signals respectively in said third and fourth linear combinations depending on said third to sixth and tenth electrical signals;

first adder means receiving said first and third linear combinations and adding them to form a pitch first electrical command applied to said first airfoils; and second adder means receiving said second and fourth linear combinations and adding them to form a thrust second electrical command applied to said engine.

It can thus be seen that in accordance with the invention each of the pitch and thrust commands is a linear combination comprising static parameters (the longitudinal parameter setting such as trim, and the speed setting) and dynamic parameters (the instantaneous speed, longitudinal trim, pitch rate, and angle of incidence). Thus:

a voluntary change in the trim setting, for example, can automatically cause the speed setting to be maintained at its value preceding the change in trim since the trim setting has an effect on the commands applied to the engines;

a voluntary change in the speed setting can automatically maintain the longitudinal trim at its value preceding the change in speed since the speed setting has an effect on the pitch command;

the dynamic ranges of voluntary changes in the pitch and speed settings are adjusted by speed, trim, pitch rate, and/or angle of incidence feedback calculated by said second calculation device and applied to said first and second linear combinations; and gusts of wind, both horizontal and vertical, are taken into account by the system, since such gusts of wind give rise to changes in air speed and/or angle of incidence, and since these two parameters are present both in the pitch command and in the thrust command. As a result, the system of the invention is capable of maintaining both pitch and speed at their set values during gusts of wind, thereby ensuring passenger comfort.

Since both the pitch command and the thrust command are respective linear combinations of six parameters (the longitudinal parameter setting, the speed setting, the instantaneous speed, trim, pitch rate, and angle of incidence), the influence of each of these six parameters in each command is controlled by the value and the sign of the coefficient associated with each parameter. Thus, each of the twelve parameters (six for the pitch command and six for the thrust command) is itself determined by calculation as a function of the desired influence of the corresponding parameter in each of said commands. However, the desired influence of each of said parameters in each of the two commands must be variable as a function of the mass of the aircraft (airliner, fighter, etc. . . . ), of the position of the center of gravity of the aircraft, of the configuration taken up by its various airfoils (flaps, slats, deflectors, etc. . . . extended or retracted as a function of different stages of flight), and of flight altitude (which determines the efficiency of the airfoils and of the engines). That is why the said coefficients are themselves dependent on said third to sixth signals and on said tenth signal.

According to an important feature of the present invention, said first calculation device incorporates a first memory containing a plurality of sets of four coefficients for said first and second linear combinations, a particular one of said sets of four coefficients being selected from amongst the others as a function of said third to sixth and tenth electrical signals. Similarly, according to another important feature of the present invention, said second calculation device incorporates a second memory containing a plurality of sets of eight coefficients for said third and fourth linear combinations, a particular one of said sets of eight coefficients being selected from amongst the others as a function of said third to sixth and tenth electrical signals.

Preferably, the system of the invention further includes:

subtractor and integrator means for taking the difference between said second and tenth electrical signals, and integrating it;

first amplifier means for amplifying said integrated difference from said subtractor and integrator means, the gain of said first amplifier means being a function of said third to sixth and tenth electrical signals;

third adder means for adding said integrated and amplified difference from said first amplifier means to said pitch first electrical command;

second amplifier means for amplifying said integrated difference from said subtractor and integrator means, the gain of said second amplifier means being a function of said third to sixth and tenth electrical signals; and fourth adder means for adding said integrated and amplified difference from said second amplifier means to said thrust second electrical command.

It is thus possible to remedy any possible static error between the speed setting that appears at the output of said second transducer and the speed actually achieved by the aircraft under steady conditions.

In order to avoid the drawbacks due to the relatively slow reaction speed of the integration means, there is provided a filter having a $1/(1+\tau p)$ function, via which said second electrical signal is applied to said subtractor and integrator means. Thus, the integration and subtraction means have little effect in the event of a small error between said speed setting and the steady state speed of the aircraft, and they contribute in part only to the steady state speed achieving said speed setting.

For an aircraft in which said first pitch airfoils include pitch control surfaces and an adjustable horizontal plane, it is advantageous for the system of the present invention to include a device for distributing said pitch first electrical command between said pitch control surfaces and said adjustable horizontal plane.

It is thus possible to take advantage of the intrinsic properties of said pitch control surfaces and of said horizontal plane, while avoiding their specific drawbacks. Pitch control surfaces are known to have a very short response time, enabling the desired pitch to be attained quickly, but they cannot be used continuously since maneuverability must be retained both ways. In contrast, the adjustable horizontal plane has long response times, but it is more effective.

BROAD DESCRIPTION OF THE DRAWINGS

The figures of the accompanying drawings show how the invention can be implemented. In these figures, identical references designate items that are similar.

DETAILED DESCRIPTION OF THE INVENTION

Figure 1:
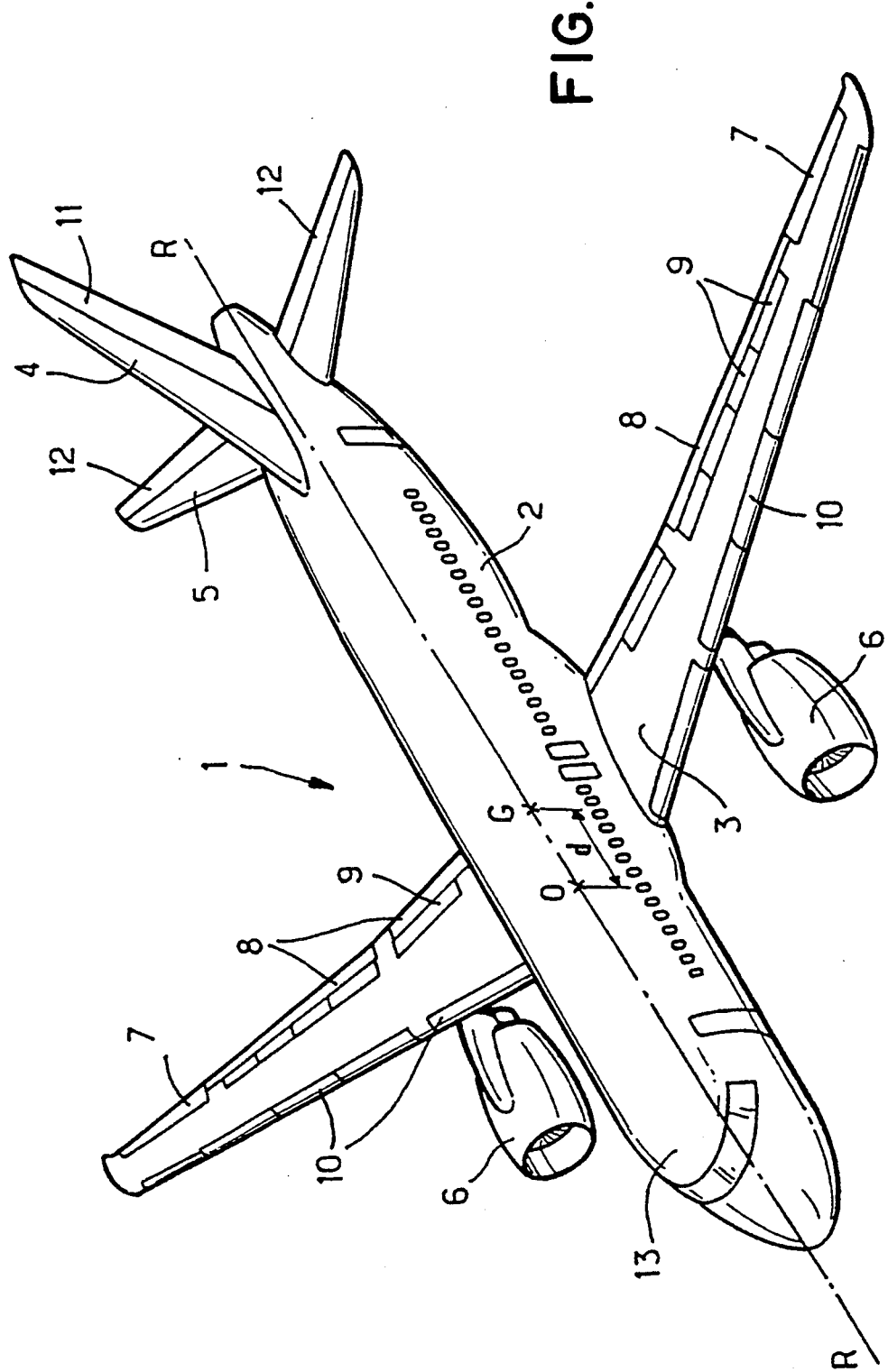
FIG. 1 is a perspective view of a civil airliner seen from above and constituting an application of the pitch and thrust control system of the invention.

A civil airliner 1 shown in perspective in FIG. 1 comprises a fuselage 2, wings 3, a vertical tail fin 4, and a horizontal tail plane 5. It is propelled by two engines 6 mounted beneath its wings 3.

The top surfaces of the wings 3 are provided with trailing edge ailerons 7, flaps 8, deflectors 9, and leading edge slats 10. In conventional manner, some of the deflectors 9 can be used as air brakes, and others as roll deflectors in combination with the ailerons 7. In addition, the deflectors 9 can be used as spoiler flaps and, optionally in co-operation with the ailerons 7, they may exert a load-lightening function to reduce the bending forces applied to said wings 3.

The vertical tail fin 4 is provided with a rudder 11 and the pitch control surfaces 12 are hinged to the trailing edge of the horizontal tail plane 5. The tail plane 5 may itself be movable to form an adjustable horizontal stabilizer or plane suitable for use in controlling the pitch of the aircraft 1.

Figure 2:
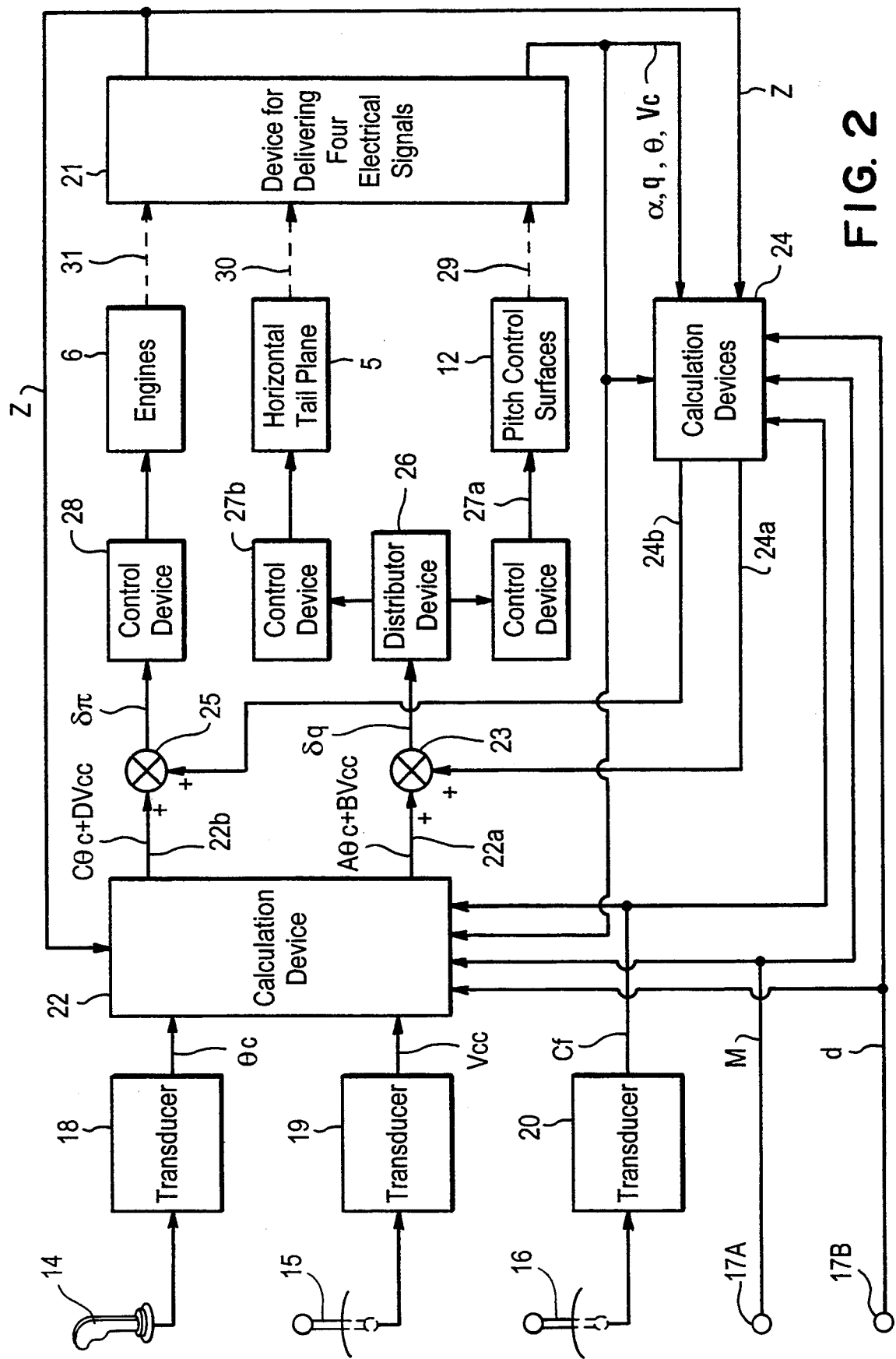
FIG. 2 is a block diagram of the pitch and thrust control system of the invention.

For the purpose of controlling the pitch of the aircraft 1, at least one joystick 14 is provided in the cockpit 13 thereof for use by a pilot (see FIG. 2). The joystick 14 controls the pitch control surfaces 12 and, optionally, the horizontal tail plane 5.

In addition, to control the thrust of the engines 6, a throttle 15 is also disposed in the cockpit 13.

The present invention relates only to controlling the engines 6 and the pitch control surfaces 12 (optionally together with the horizontal tail plane 5), and as a result the controls for the ailerons 7, the flaps 8, the deflectors 9, and the slats 10 are not described. It is merely recalled that in conventional manner and as a function of the stage of flight (cruising, landing, taking off, . . . ), said airfoils 7 to 10 are either extended or else they are retracted, and that each particular stage of flight corresponds to a particular configuration in which some of said airfoils 7 to 10 are extended and others are retracted. Each of these configurations is selected by the pilot using a selector member 16 (see FIG. 2).

In addition, the aircraft 1 is provided with terminals 17A and 17B making electrical signals available respectively representative of the mass M of the aircraft 1 and of the distance d' along the longitudinal roll axis R—R of the aircraft 1 between its center of gravity G and an origin O. Such electrical signals may come from setting devices (not shown) on which the pilot sets the magnitudes M and d'. However, the signal at terminal 17B may also come from a calculation device (not shown)

that continuously calculates the position of the center of gravity G.

As shown in FIG. 2, the system of the present invention includes:

a transducer 18 transforming the position of the joystick 14 into an electrical signal and delivering such a signal at its output representative of a longitudinal parameter setting, such as the trim setting $\theta c$ desired by the pilot for the aircraft 1 and set by the pilot by corresponding actuation of the joystick 14. It will be understood that instead of being trim, said longitudinal parameter setting could be climb angle or vertical load factor;

a transducer 19 transforming the position of the throttle 15 into an electrical signal and delivering an output signal representative of the speed setting Vcc desired by the pilot for the aircraft 1 and set by the pilot by corresponding actuation of said throttle 15; and a transducer 20 transforming the position of a configuration-selector member 16 and delivering an output signal representative of the current configuration Cf as selected by the pilot by corresponding actuation of said member 16.

In addition, in conventional manner, the aircraft 1 carries a device 21 such as an Air Data Inertial Reference System (ADIRS) suitable for continuously delivering four electrical signals respectively representative of the instantaneous speed Vc, longitudinal trim $\theta$, pitch rate q', and angle of incidence a of the aircraft 1, said device further including a radio altimeter or the like suitable for continuously delivering an electrical signal representative of flight altitude Z.

The various electrical signals defined above are designated below by the magnitudes that they represent respectively.

As can be seen in FIG. 2, the system of the invention further includes a calculation device 22 receiving the signals $\theta c$, Vcc, Cf, M, d', Vc, and Z, and provided with two outputs 22a and 22b. The signal appearing at the output 22a of the device 22 is a linear combination of the signals $\theta c$ and Vcc, said combination being of the type $A\theta c + BVcc$, in which expression the coefficients A and B depend on the signals Cf, M, d', Vc, and Z. Similarly, the signal that appears on the output 22b of the device is also a linear combination of the signals $\theta c$ and Vcc, of the type $C\theta c + DVcc$, in which expression the coefficients C and D depend on the signals Cf, M, d', Vc, and Z.

It can be seen that the calculation device 22 may comprise a table or matrix containing pluralities of sets of four coefficients A, B, C, and D, with a particular one of these sets being selected as a function of the instantaneous values of Cf, M, d', Vc, and Z. The particular set of four coefficients that is used may optionally be the result of interpolating as a function of the five above-mentioned instantaneous values between two sets A, B, C, and D stored in said table or matrix.

The signal $A\theta c + BVcc$ appearing at the output 22a of the calculation device 22 is applied to one of the inputs of an adder 23 whose other input receives a signal coming from the output 24a of a calculation device 24. This calculation device 24 receives the signals Cf, M, d', Z, a, q', $\theta$, and Vc, and at its output 24a it delivers a linear combination of the signals a, q', $\theta$, and Vc, of the type $aa + bq + c\theta + dVc$, in which expression the coefficients a', b', c', and d' depend on the signals Cf, M, d, Vc, and Z. Thus, at the output from the adder 23 there appears a signal $\delta q$ such that:

$$\delta q = A\theta c + BVcc + aa + bq + c\theta + dVc \qquad (1)$$

In addition, the signal $C\theta c + DVcc$ appearing at the output 22b of the calculation device 22 is applied to one of the inputs of an adder 25 whose other input receives a signal coming from another output 24b of the calculation device 24. This output 24b delivers a linear combination of the signals a, q', $\theta$, and Vc, of the type $ea + fq + g\theta + hVc$, in which expression the coefficients e', f', g', and h' depend on the signals Cf, M, d', Vc, and Z. Thus, at the output of the adder 25, there appears a signal $\delta \pi$ such that:

$$\delta \pi = C\theta c + DVcc + ea + fq + g\theta + hVc \qquad (2)$$

It can be seen that the calculation device 24 may comprise a table or matrix containing pluralities of sets of eight coefficients a', b', c', d', e', f', g', and h', with a particular one of these sets being selected as a function of the values of Cf, M, d', Vc, and Z.

The signal $\delta q$ obtained in this way and appearing at the output of the adder 23 is used as a pitch command for the aircraft 1. To this end, if the horizontal tail plane 5 is of the adjustable horizontal stabilizer type, the signal $\delta q$ is applied to a distributor device 26 whose purpose is to distribute said signal $\delta q$ between the control device 27a for the control surfaces 12 and the control device 27b of said variable horizontal tail plane as a function of the efficiencies specific to said adjustable horizontal stabilizer 5 and to the pitch control surfaces 12. Naturally, if the horizontal tail plane 5 is fixed, then the entire signal $\delta q$ is applied to the pitch control surfaces 12.

Similarly, the signal $\delta \pi$ calculated in the manner described above and appearing at the output of the adder 25 is used as a command for controlling the thrust of the engines 6 of the aircraft 1. To do this, the signal $\delta \pi$ is applied to the control device 28 therefor. The control device 28 may be of the Full Authority Digital Engine Control (FADEC) type, for example.

Naturally, the action of the horizontal tail plane 5, of the control surfaces 12, and of the engines 6 under the action of the signals $\delta q$ and $\delta \pi$ changes the values of a, q', $\theta$, and Vc as detected by the device 21, and this is represented in FIG. 2 by dashed arrows 29, 30, and 31.

Thus, if the pilot acts on the joystick 14 to control the desired trim $\theta c$, the pitch command $\delta q$ takes account immediately of the value of this trim setting to actuate the pitch control surfaces 12 and/or the adjustable horizontal tail plane 5. The aircraft 1 thus takes up this trim $\theta c$ at a rate determined by the feedback concerning the angle of incidence a, the pitch rate q', and the trim $\theta$ as determined by the term aa, bq, and c$\theta$ in above-defined expression (1). Simultaneously with the action on the pitch control surfaces 12 and/or on the adjustable horizontal tail plane 5, the thrust command $\delta \pi$ takes account of the value of the trim setting $\theta c$ because of the term C$\theta$c, and also because of the feedback ea, fq, and g$\theta$ in expression (2) which continuously adjusts the thrust of the engines 6 so that the change in trim takes place at constant speed. As a result, when trim is changed, the commands $\delta q$ and $\delta \pi$ are not influenced in any way by the feedback terms dVc and hVc.

If the pilot now acts on the throttle 15 to change the speed setting Vcc, the engines 6 are immediately acted on by the command $\delta \pi$ and the same applies to the pitch control surfaces 12 and/or the adjustable horizontal tail plane 5 because of the term BVcc in the command δq. As the speed of the aircraft 1 changes, the feedback terms dVc and aα in the command δq influence the extent to which said pitch control surfaces 12 and/or said adjustable horizontal tail plane 5 are tilted so as to maintain constant trim $\theta c$, while feedback terms eα and hVc in the command δπ fix the rate at which the speed of the aircraft 1 changes.

If a longitudinal gust of wind (from in front or behind) should occur, then there will be a change in Vc. Because of the terms dVc in the command δq and hVc in the command δπ, compensating changes (positive or negative) will appear in the speed and the trim of the aircraft 1. Under such circumstances, the angle of incidence α, the pitch rate q', and the trim $\theta$ vary little, such that passenger comfort is ensured throughout the aircraft 1.

If a vertical gust of wind should occur, the angle of incidence α will change. The terms aα and eα in the commands δq and δπ then enable longitudinal trim to be maintained and modify the engine thrust 6 to remain at constant speed.

There follow four examples of values for the various coefficients in the four linear combinations for an airliner flying in a landing configuration with its landing gear extended at an altitude Z of 5000 feet.

EXAMPLE 1

The aircraft 1 has a mass M equal to 52 tonnes (i.e. metric tons) and it flies at a speed Vc of 130 knots. The distance d' represents 10% of the mean aerodynamic chord of the wings 3 and it is measured from the orthogonal projection of the leading edge of said mean aerodynamic chord on the longitudinal axis R—R towards the orthogonal projection on said longitudinal axis of the trailing edge of said mean aerodynamic chord. Under such circumstances:

| A = −0.67 | B = +0.07 | C = +0.82 | D = +1.7 |
|---|---|---|---|
| a = −0.48 | b = +0.38 | c = +0.82 | d = −0.03 |
| e = −1 | f = +2.4 | g = +3.5 | h = −0.32 |

EXAMPLE 2

The aircraft has a mass M of 63 tonnes; its speed Vc is 130 knots and its center of gravity distance d' (as defined in Example 1) is equal to 38%. In which case:

| A = −0.69 | B = +0.07 | C = +0.86 | D = +1.58 |
|---|---|---|---|
| a = −0.20 | b = +0.46 | c = +0.88 | d = −0.05 |
| e = −1 | f = +2.3 | g = +3.2 | h = −0.30 |

EXAMPLE 3

The aircraft has a mass M of 63 tonnes; its speed Vc is 110 knots and its center of gravity distance d' (as defined in Example 1) is equal to 38%. In which case:

| A = −0.83 | B = +0.12 | C = +0.59 | D = +1.52 |
|---|---|---|---|
| a = −0.02 | b = +0.7 | c = +1.10 | d = −0.11 |
| e = −1 | f = +2.10 | g = +3.0 | h = +0.02 |

EXAMPLE 4

The aircraft has a mass M of 52 tonnes; its speed Vc is 170 knots and its center of gravity distance d' (as defined in Example 1) is equal to 25%. In which case:

| A = −0.72 | B = +0.04 | C = +0.29 | D = +1.52 |
|---|---|---|---|
| a = −0.3 | b = +0.35 | c = +0.81 | d = −0.03 |
| e = −0.82 | f = +0.97 | g = +3.1 | h = −0.53 |

Figure 3:
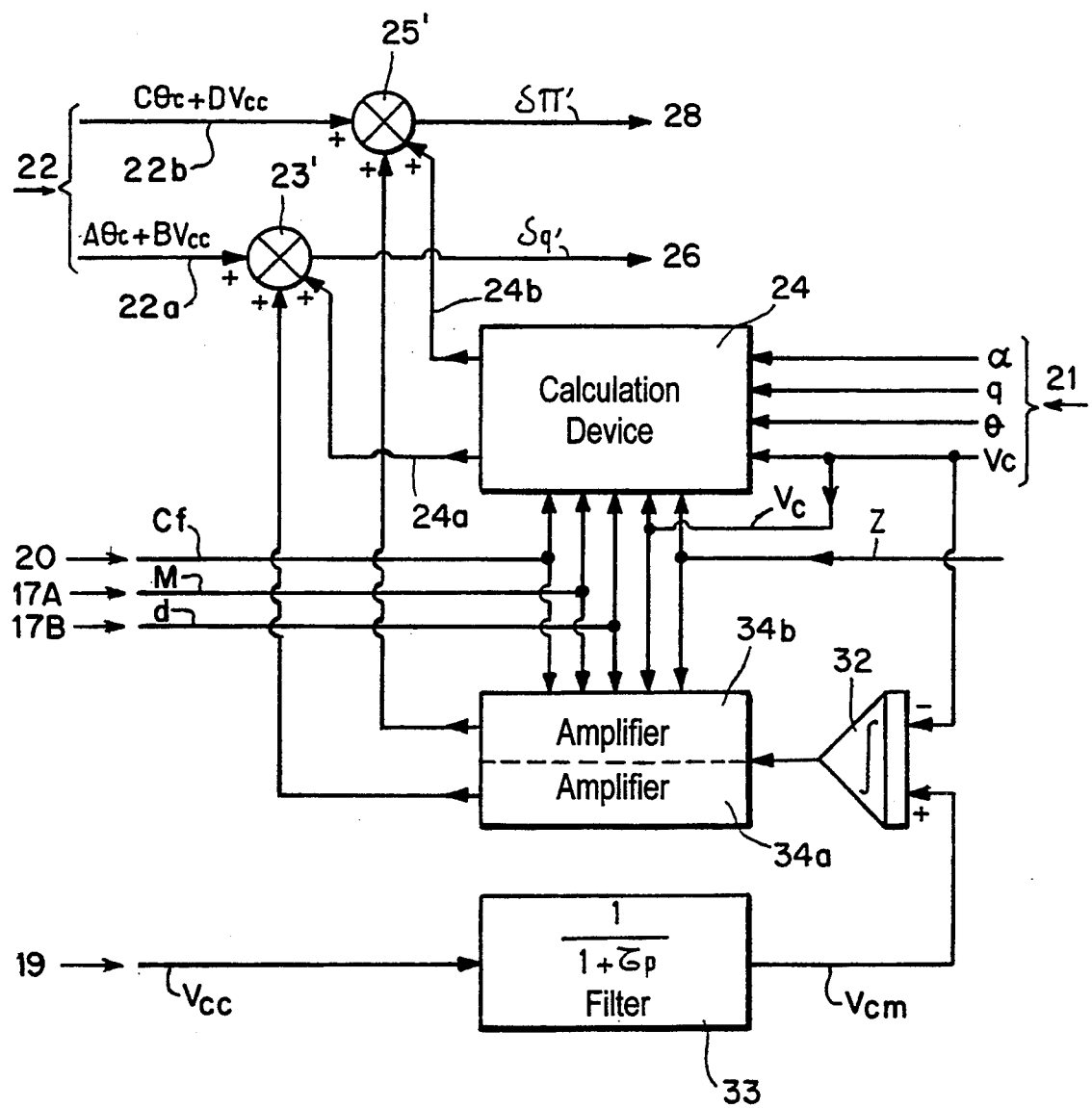
FIG. 3 is a block diagram of an improvement to the control system of the invention enabling static speed error to be eliminated.

In the block diagram of FIG. 3, there can be seen the calculation device 24 together with its inputs receiving the signals Cf, M, and d' respectively from the transducer 20 and from the terminals 17A and 17B, and its inputs receiving the signals α, q', $\theta$, Vc, and Z from the device 21. The outputs 24a and 24b of the calculation device 24 are respectively connected to one of the inputs of two three-input adders 23' and 25' that replace the adders 23 and 25 described above. As before, another input of each of the adders 23' and 25' receives a respective one of the first and second linear combinations A$\theta$c+BVcc and C$\theta$c+DVcc.

In addition, the system of FIG. 3 includes a comparator-integrator 32 whose negative input is supplied with the signal Vc from the device 21 and whose positive input receives the speed setting signal Vcc from the transducer 19 via a filter 33. The filter 33 has a function of the type $1/(1+\tau p)$, such that the filtered signal Vcm as applied to the positive input of the comparator-integrator 32 is Vcm=Vcc/(1+τp).

The output from the comparator-integrator 32 is connected to a pair of amplifiers 34a and 34b. The output from amplifier 34a is connected to the third input of adder 23' and the output from amplifier 34b is connected to the third input of adder 25'. The pair of amplifiers 34a and 34b receives the signals Cf, M, d', Vc, and Z, and the gains g1, and g2 of the amplifiers 34a and 34b are a function of said signals Cf, M, d', Vc, and Z.

Thus, the output of amplifier 34a provides the signal
g1.∫(Vcm−Vc)
whereas the output of amplifier 34b provides the signal
g2.∫(Vcm−Vc)

As a result, a pitch control signal δq' appears at the output of adder 23' as given by:

$$\delta q' = A\theta c + BVcc + a\alpha + bq + c\theta + dVc + g\text{-}1.\int(Vcm-Vc)$$

whereas a thrust control signal δπ' appears at the output of adder 25', equal to $$\delta\pi' = C\theta c + DVcc + e\alpha + fq + g\theta + hVc + g\text{-}2.\int(Vcm-Vc)$$

By virtue of the integral term in said pitch and thrust control signals, it is certain that under steady conditions, the speed Vc will be equal to the speed setting Vcc.

In the examples given above of the various linear combination coefficients, the gains g1 and g2 have the following values:
g1=0.001 and g2=0.03 (Example 1)
g1=0.001 and g2=0.02 (Example 2)
g1=0.0022 and g2=0.027 (Example 3)
g1=0.0008 and g2=0.028 (Example 4)

What is claimed is:

1. A pitch and thrust control system for an aircraft (1), comprising:

(a) first airfoils for pitch control (5, 12) actuated from a first actuator member (14) associated with a first transducer (18) delivering a first electrical signal representative of a first longitudinal parameter setting (Θc));

(b) at least one engine (6) controlled from a second actuator member (15) associated with a second transducer (19) delivering a second electrical signal representative of a speed setting (Vcc) for said aircraft;

(c) a plurality of second airfoils (7, 8, 9, 10) for taking up different relative positions as a function of each stage of flight of the aircraft, defining particular aerodynamic configurations, with one or other of said aerodynamic configurations being selected by actuating a third actuator member (16) associated with a third transducer (20) delivering a third electrical signal representative of the selected configuration (Cf);

(d) means (17A) for delivering a fourth electrical signal representative of the mass (M) of said aircraft (1);

(e) means (17B) for delivering a fifth electrical signal representative of the distance (d') along the longitudinal axis (R—R) of said aircraft between the center of gravity (G) of said aircraft and an origin (O);

(f) means (21) for delivering sixth, seventh, eighth, ninth, and tenth electrical signals respectively representative of instantaneous flight altitude (Z), aerodynamic angle of incidence (α), pitching rate (q'), longitudinal trim (Θ), and speed (Vc) of said aircraft;

(g) a first calculation device (22) receiving said first to sixth electrical signals, together with said tenth electrical signal and delivering first and second linear combinations (AΘc+BVcc; CΘc+DVcc) of said first and second electrical signals (Θc) Vcc), with the coefficients (A, B and C, D) given to said first and second electrical signals, respectively, in said first and second linear combinations depending on said third to sixth and tenth electrical signals;

(h) a second calculation device (24) receiving said third to tenth electrical signals and generating third and fourth linear combinations (aα+bq+cΘ+dVc; eα+fq+gΘ+hVc) of said seventh to tenth electrical signals, the coefficients (a, b, c, d; e, f, g, h) given to said seventh to tenth electrical signals, respectively, in said third and fourth linear combinations depending on said third to sixth and tenth electrical signals;

(i) first adder means (23) receiving said first and third linear combinations and adding them to form a pitch first electrical command (δq) applied to said first airfoils (5, 12): and (j) second adder means (25) receiving said second and fourth linear combinations and adding them to form a thrust second electrical command (δπ) applied to an engine (6) of said aircraft.

2. A control system according to claim 1, wherein said first calculation device (22) incorporates a first memory containing a plurality of sets of four coefficients (A, B, C, D) for said first and second linear combinations (AΘc+BVcc; CΘc+DVcc), a particular one of said sets of four coefficients being selected from amongst the others as a function of said third to sixth and tenth electrical signals (Cf, M, d', Z, and Vc).

3. A control system according to claim 1 or 2, wherein said second calculation device (24) incorporates a second memory containing a plurality of sets of eight coefficients (a, b, c, d, e, f, g, and h) for said third and fourth linear combinations (aα+bq+cΘ+dVc; eα+fq+gΘ+hVc), a particular one of said sets of eight coefficients being selected from amongst the others as a function of said third to sixth and tenth electrical signals (Cf, M, d', z, and Vc).

4. A control system according to claim 3 further including:

(a) subtractor and integrator means (32) for taking the difference between said second and tenth electrical signals, and integrating said difference;

(b) first amplifier means (34a) for amplifying said integrated difference from said subtractor and integrator means (32), the gain of said first amplifier means being a function of said third to sixth and tenth electrical signals;

(c) third adder means (23') for adding said integrated and amplified difference from said amplifier means (34a) to said pitch first electrical command (δq);

(d) second amplifier means (34b) for amplifying said integrated difference from said subtractor and integrator means (32), the gain of said second amplifier means being a function of said third to sixth and tenth electrical signals; and (e) fourth adder means (25') for adding said integrated and amplified difference from said second amplifier means (34b) to said thrust second electrical command (δπ).

5. A system according to claim 4, further including a filter (33) having a 1/(1+p) function, via which said second electrical signal is applied to said subtractor and integrator means (32).

6. A system according to claim 1 or 2 wherein said first airfoils for pitch control comprise pitch control surfaces (12) and an adjustable horizontal plane (5), said system further including a device (26) for distributing said pitch first electrical compound (δq) between said pitch control surfaces (12) and said adjustable horizontal plane (5).

* * * * *